(12) United States Patent
Hardy

(10) Patent No.: US 6,571,177 B1
(45) Date of Patent: May 27, 2003

(54) COLOR DISPLAYS OF MULTIPLE SLICES OF 3-D SEISMIC DATA

(75) Inventor: Humphrey H. Hardy, Ponca City, OK (US)

(73) Assignee: Conoco Inc., Houston, TX (US)

( * ) Notice: Subject to any disclaimer, the term of this patent is extended or adjusted under 35 U.S.C. 154(b) by 378 days.

(21) Appl. No.: 09/664,176

(22) Filed: Sep. 18, 2000

(51) Int. Cl.[7] .................................................. G01V 1/28
(52) U.S. Cl. ............................................ 702/16; 367/70
(58) Field of Search ............................. 702/16; 367/73, 367/72, 70

(56) References Cited

U.S. PATENT DOCUMENTS

| | | | |
|---|---|---|---|
| 4,467,461 A | 8/1984 | Rice | 367/70 |
| 4,764,904 A | 8/1988 | Salomonsen et al. | 367/70 |
| 5,280,344 A | 1/1994 | Witlin et al. | 358/21 R |
| 5,563,949 A | 10/1996 | Bahorich et al. | 364/421 |
| 5,892,732 A | 4/1999 | Gersztenkorn | 367/72 |
| 5,930,730 A | 7/1999 | Marfurt et al. | 702/16 |
| 5,995,448 A | 11/1999 | Krehbiel | 367/70 |
| 6,055,482 A | 4/2000 | Sudhakar et al. | 702/16 |
| 6,084,825 A | 7/2000 | Poggiagliolmi | 367/30 |

FOREIGN PATENT DOCUMENTS

| | | |
|---|---|---|
| GB | 2139758 A | 11/1984 |
| WO | WO 00/14574 | 3/2000 |

OTHER PUBLICATIONS

Gerald D. Kidd; *Fundamentals of 3-d seismic volume visualization*, The Leading Edge Jun. 1999, pp. 802–712.

*Primary Examiner*—Donald E. McElheny, Jr.
(74) *Attorney, Agent, or Firm*—Madan, Mossman& Sriram, P.C.

(57) ABSTRACT

Three substantially parallel surfaces are selected in a 3-D data volume and values of a seismic attribute on each of the three surfaces are encoded onto a Red-Green-Blue (RGB) color scale. A single display of this encoded data makes it possible to get a visualization of and interpret subtle structural and stratigraphic features of the 3-D data volume. The displayed seismic attribute may be the amplitude or one of many commonly used attributes. The 3-D data volume may be defined in terms of seismic times or in terms of seismic depths.

10 Claims, 6 Drawing Sheets

(3 of 6 Drawing Sheet(s) Filed in Color)

COLOR DISPLAYS OF MULTIPLE SLICES OF 3-D SEISMIC DATA

BACKGROUND OF THE INVENTION

1. Field of the Invention

This invention relates to the general subject of seismic exploration and, in particular, to methods for displaying attributes of a 3-D volume of seismic data for identifying structural and stratigraphic features in three dimensions.

2. Background of the Invention

2-D seismic data is acquired along lines that consist of geophone arrays onshore or hydrophone streamer traverses offshore. FIG. 1, shows an example of portions of a marine seismic data acquisition system. A vessel 10 on a body of water 15 overlying the earth 16 has deployed behind it a seismic source array 20 and a streamer cable 25. The seismic source array 20 is typically made up of individual air guns (not shown) that are fired under the control a controller (not shown) aboard the vessel 10. Seismic pulses propagate into the earth and are reflected by a reflector 22 therein. Exemplary raypaths 41a, 41b from the source to the receiver are shown. For simplifying the illustration, only one reflector is shown: in reality, there would be numerous reflectors, each giving rise to a reflected pulse. After reflection, these pulses travel back to the surface where they are recorded by detectors (hydrophones) 30a, 30b, . . . 30n in the streamer cable. The depth of the source array and the streamer cable are controlled by auxiliary devices (not shown). In acquiring a line of seismic data, the vessel 10 travels in the water and periodically fires the airgun 20 at different source locations. Data corresponding to each such source location are recorded by the plurality of receivers.

The acquisition geometry for a full 3-D data set on land is illustrated in FIG. 2 wherein, within a region 119, sources 124 are deployed along a plurality of source lines 126a, 126b . . . 126n and data are recorded by receivers 122 along receiver lines 120a, 120b . . . 120n nominally defining an inline direction. In conventional processing, data from the plurality of sources and receivers are output into bins such as 121. With this high density coverage, extremely large volumes of digital data need to be recorded, stored and processed before final interpretation can be made. Processing requires extensive computer resources and complex software to enhance the signal received from the subsurface and to mute accompanying noise which masks the signal.

3-D marine seismic data may be acquired (not shown) by using a plurality of widely spaced parallel streamers recording energy that has been generated by a number of seismic sources that are spaced apart in the crossline direction.

Once the data is processed, geophysical staff compile and interpret the 3-D seismic information in the form of a 3-D cube which effectively represents a display of subsurface features. Using the data cube, information can be displayed in various forms. A commonly used display comprises horizontal time slice maps can at selected depths, an example of which is shown in FIG. 3. Using a computer workstation an interpreter can slice through the field to investigate reservoir issues at different horizons. Vertical slices or sections can also be made in any direction using seismic or well data. Time maps can be converted to depth to provide a structural interpretation at a specific level.

Seismic data has been traditionally acquired and processed for the purpose of imaging seismic reflections. Changes in stratigraphy are often difficult to detect on traditional seismic displays due to the limited amount of information that stratigraphic features present in a cross-section view. Although such views provide an opportunity to see a much larger portion of these features, it is difficult to identify fault surfaces within a 3-D volume where no fault reflections have been recorded.

U.S. Pat. No. 5,563,949 to Bahorick et al teaches dividing the three-dimensional volume into a plurality of vertically stacked and generally spaced apart horizontal slices; dividing each of the slices into a plurality of cells; measuring across each of the cells the cross-correlation between one pair of traces lying in one vertical plane to obtain an inline value and measuring the cross-correlation between another pair of traces lying in another vertical plane to obtain a crossline value that are estimates of the time dip in an inline direction and in a crossline direction; combining the inline value and the crossline value to obtain one coherency value for each of the cells; and displaying the coherency values of the cells across. Such a coherency display is particularly well suited for interpreting fault planes within a 3-D seismic volume and for detecting subtle stratigraphic features in 3-D. This is because seismic traces cut by a fault line generally have a different seismic character than traces on either side of the fault. Measuring trace similarity, (i.e., coherence or 3-D continuity) along a time slice reveals lineaments of low coherence along these fault lines. Such coherency values can reveal critical subsurface details that are not readily apparent on traditional seismic sections. Also by calculating coherence along a series of time slices, these fault lineaments identify fault planes or surfaces.

U.S. Pat. No. 5,892,732 to Gersztenkorn discloses a modification of the Bahorich invention wherein a covariance matrix is determined for each of the cells and a seismic attribute determined from the eigenvalues of the covariance matrix is displayed. Gersztenkorn teaches that the ratio of the dominant eigenvalue of the covariance matrix to the sum of the eigenvalues is an indication of the coherence of the data.

U.S. Pat. No. 6,055,482 to Sudhakar et al. teaches display of other types of seismic attributes in a 3-D data volume. For example, azimuth ordered seismic gathers are used to identify subterranean features such as fault and fracture patterns. Offset ordered coherence analysis is used to form an optimum stack at the subterranean location of interest.

A number of prior patents teach the use of color for displaying of seismic data to bring out features that are normally lost in a conventional seismic display. The teachings of U.S. Pat. No. 4,467,461 to Rice allow the interpreter to more easily comprehend simultaneous variation of several geophysical data attributes and to relate the effects to a specific end result for the geophysical indicators of interest. One or more geophysical attribute variables are quantified and then rasterized so that the data is represented as a gridded variable area display wherein color intensity of the grid units is some function of the instantaneous variable. The resulting data is then loaded into digital refresh memory of an image processing computer whereupon it us interactively mixed for analysis in accordance with operator selected colors and color intensity weighting.

In U.S. Pat. No. 5,995,448 to Krehbiel, a suite of features extracted from a sequence of windows form a multivariate attribute of the raw data. These features include the energy, slope in the middle of a window, the autocorrelation, average trace amplitude, standard deviation of the amplitude, first and second lags of the autocorrelation. Combinations of three of these features are color coded and superimposed on a display of the seismic section.

U.S. Pat. No. 5,930,730 to Marfurt et al teaches the use of color displays for a 3-D volume of seismic data. A color map, characterized by hue, saturation and lightness, is used to depict semblance/similarity, true dip azimuth and true dip of each cell; true dip azimuth is mapped onto the hue scale, true dip is mapped onto the saturation scale, and the largest measurement of semblance/similarity is mapped onto the lightness scale of the color map.

PCT Patent Publication WO 0014574 to Giertsen et al discloses a method of producing one or more volume windows within a 3-D data volume that can be interactively moved around in the entire data volume and viewed from different positions at different angles. By color and opacity manipulations inside the volume windows, the data therein are made transparent, allowing for visualization of selected target portions of the data set.

As pointed out in Giertsen, it is difficult to get a good understanding of complicated 3-D data set on a flat screen or a piece of paper. It is also laborious and difficult to interact with 3-D objects using a keyboard and a mouse. Analysis of 3-D data sets are commonly done using 2-D slices through the data cube. Furthermore, the screen size limits the amount of information that can be presented. Yet another drawback of prior methods of displaying 3-D data is that the interactive output of a graphical workstation is necessarily viewable only by a limited number of viewers. The present invention addresses these problems.

SUMMARY OF THE INVENTION

The present invention is a method of geophysical prospecting wherein a set of seismic traces are obtained over a predetermined three-dimensional (3-D) volume of the earth. At least three substantially parallel surfaces are defined in the 3-D volume and a different color is associated with each of the surfaces. Values of a seismic attribute on the three surfaces are encoded onto corresponding color scales and displayed in a single display. In one embodiment of invention, the selected colors are red, green and blue. In a preferred embodiment of the invention, the seismic attribute is the amplitude of the trace, although any of a commonly used set of seismic attributes may be displayed. The three surfaces may be isotime surfaces or they may be parallel to a fault plane or to an interpreted horizon. With this type of display, it is possible to visualize stratigraphic sequences along with the overall geometry of subsurface geological features.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

For detailed understanding of the present invention, references should be made to the following detailed description of the preferred embodiment, taken in conjunction with the accompanying drawings, in which like elements have been given like numerals and wherein.

DETAILED DESCRIPTION OF THE INVENTION

Figure 1:
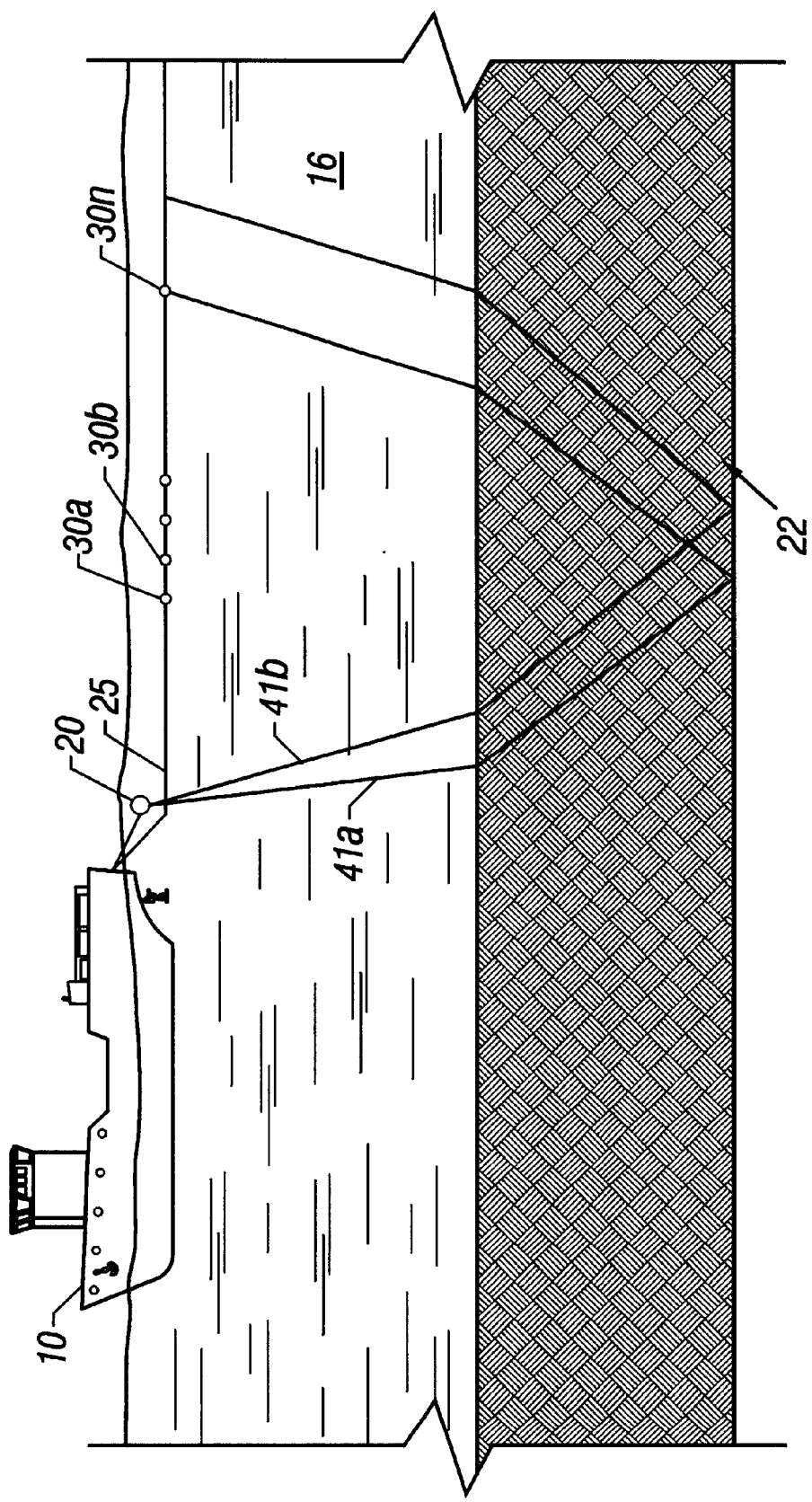
FIG. 1 (PRIOR ART) shows an example of marine seismic data acquisition.
Figure 2:
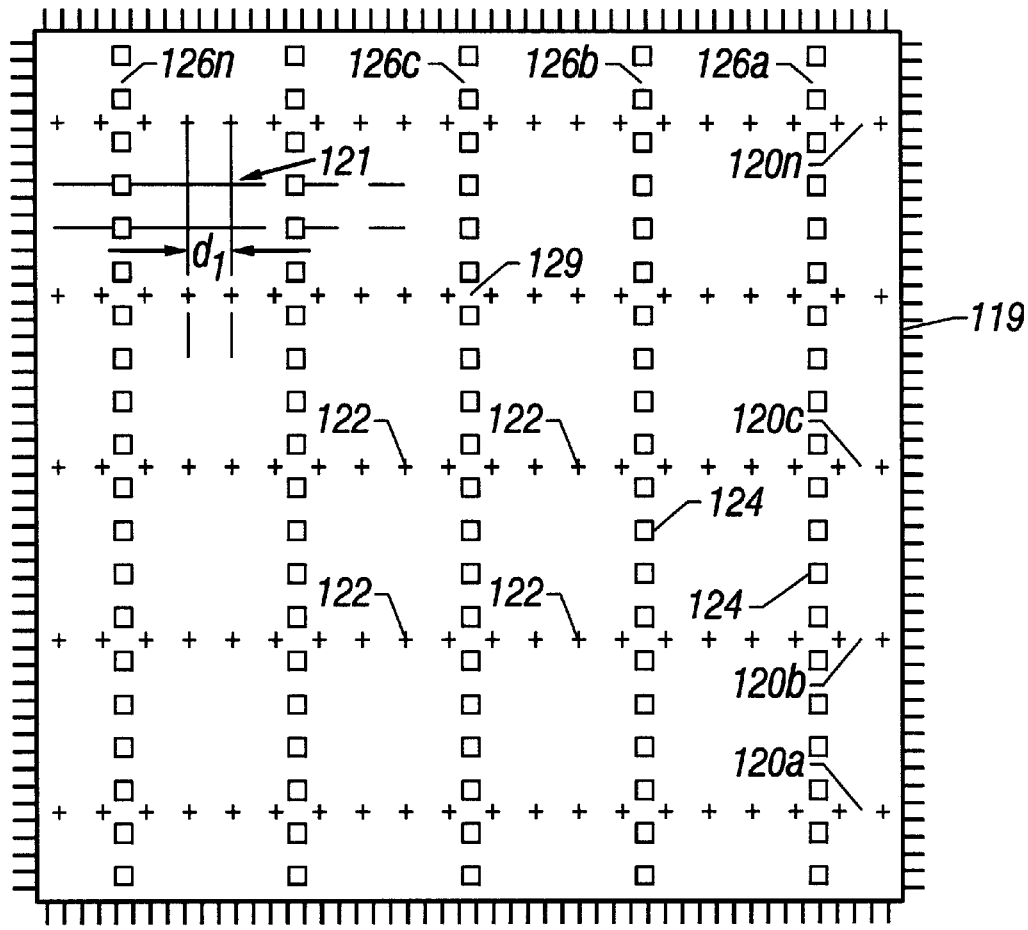
FIG. 2 (PRIOR ART) shows the geometry of a land 3-D seismic acquisition system.
Figure 3:
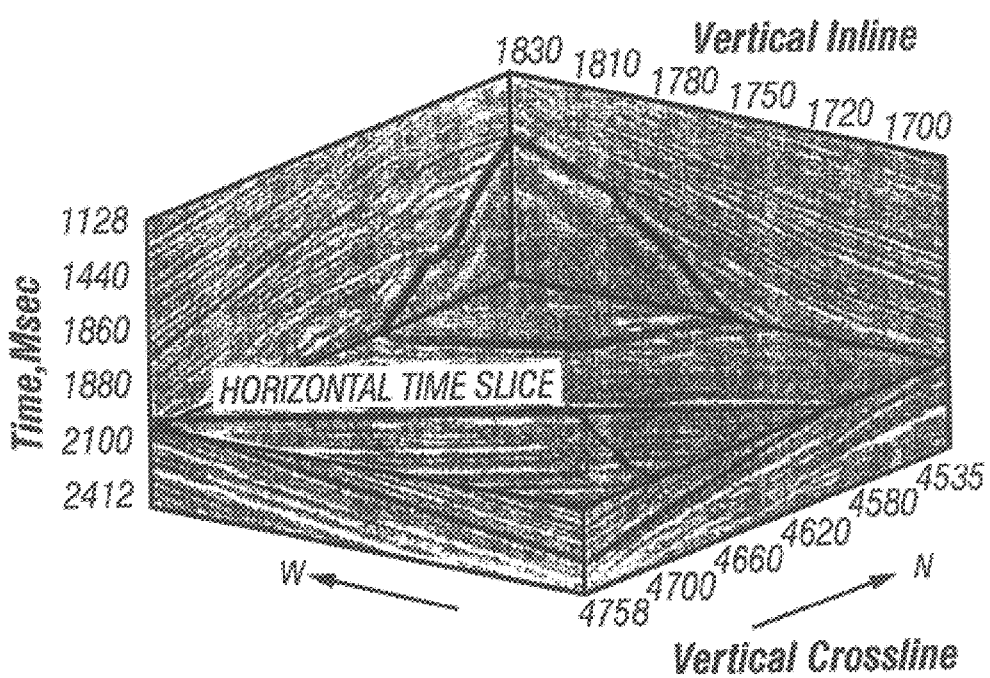
FIG. 3 (PRIOR ART) a pictorial representation of the information obtained from a 3-D seismic data.
Figure 4:
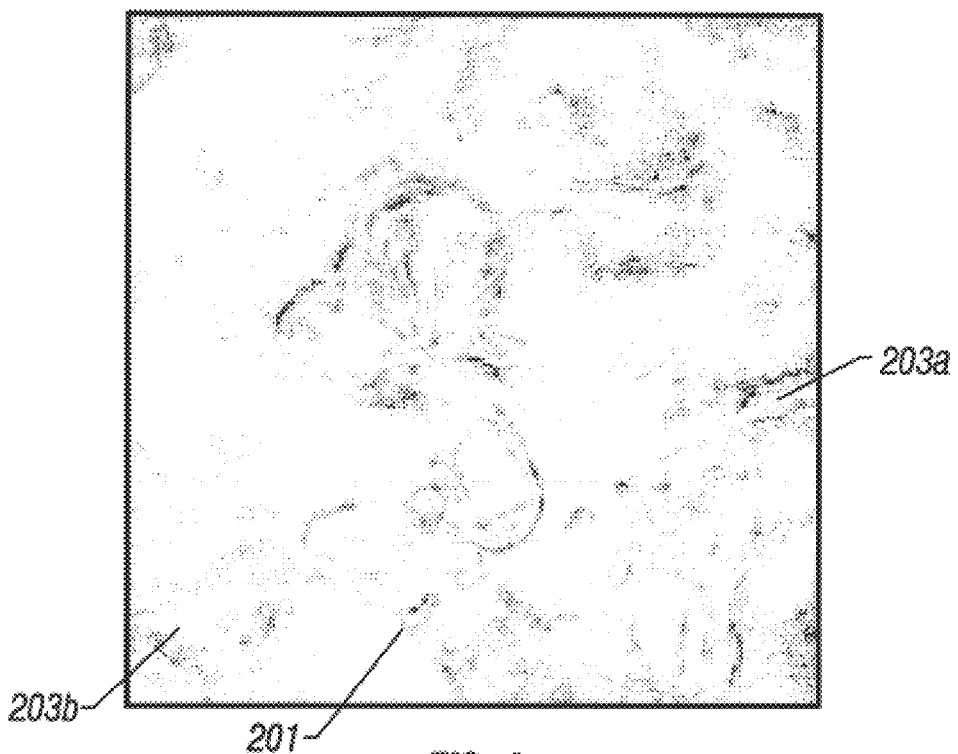
FIG. 4 (PRIOR ART) is a coherency plot within a time window of 490–510 ms. of a 3-D seismic volume.

Turning now to FIG. 3, a view of a 3-D data volume according to prior art is shown. The vertical axis is time, and data from a vertical inline, vertical crossline and a horizontal time slice are indicated. FIG. 4 shows an example of a time slice of a volume of 3-D data processed using methods similar to the teachings of Bahorich, (U.S. Pat. No. 5,563,949) the contents of which are fully incorporated herein by reference. A coherency display, as taught by Bahorich, is shown over a 20 ms. data window from 490 ms. to 510 ms. As disclosed in Bahorich, the cross-correlation between one pair of traces lying in one vertical plane is determined to obtain an inline value and the cross-correlation between another pair of traces lying in another vertical plane is determined to obtain a crossline value. The inline and the crossline crosscorrelations are combined to obtain one coherency value that is then displayed.

The coherency display data of FIG. 4 shows channels such as 201 in the display. Such channel deposits are of exploration significance since they commonly comprise high porosity sandstones, while the sediments outside the channels are typically low porosity shales that are impermeable. Locations along the channels that are in a favorable structural position with respect to the shales commonly form stratigraphic traps that are conducive to trapping hydrocarbons. Also seen in FIG. 4 is a lineament 203a–203b that could be a fault.

Figure 5:
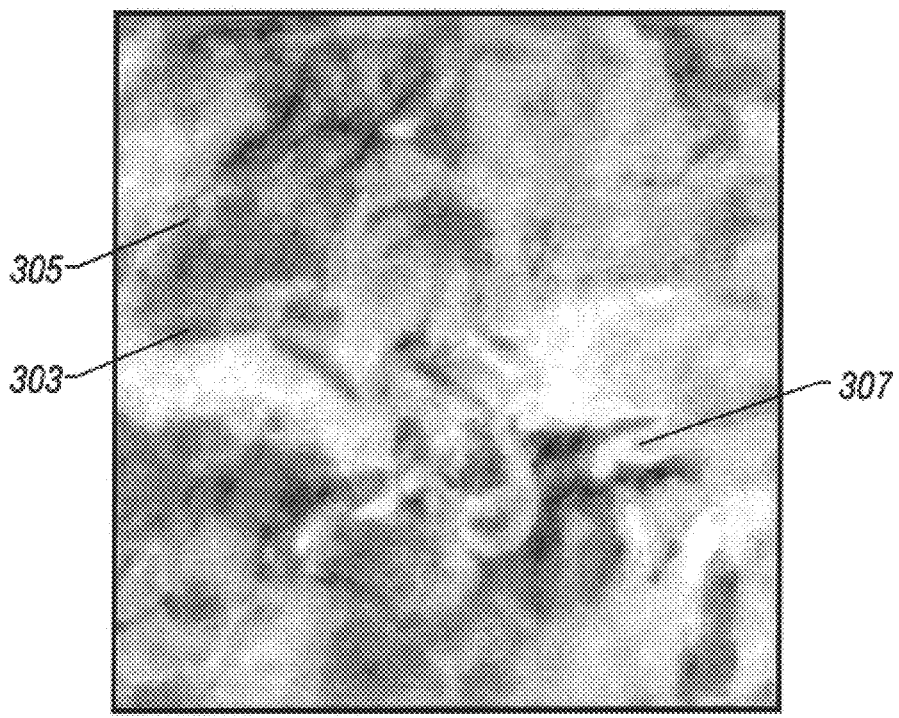
FIG. 5 is a display of seismic amplitudes at 496, 500 and 504 ms. of the same 3-D seismic volume as in FIG. 4.

Turning now to FIG. 5, a color display of seismic data from the same volume is shown. The display is that of amplitudes of the data (not coherency), with the data from 496 ms. in red, from 500 ms. in green and from 504 ms. in blue. For each level, the data are scaled so that the largest positive amplitude is in the appropriate color and the greatest negative amplitude is clear.

In the color display, each color, red, green, or blue is controlled by a color "gun". If all three guns are at their maximum value, white is the result. If all three guns are at their minimum value, black is the result. If red is maximum and the other guns are minimum, red is the result. In this fashion, data on each of the three surfaces have been coded onto a color scale.

The channel, particularly in the NW portion of the display is more complicated than it appears to be in FIG. 4. In particular, the earliest (deepest, in blue) position of the channel 303 appears to be overlain by a more recent (in green) position of the channel 305. In addition, the lineament 203a–203b of FIG. 4 and 307 in FIG. 5 appears to be a ridge (shallow in red) that has been cut through by a channel. A geologic interpretation of this would be that the ridge had relatively low relief at the deepest position and that the ridge continued to build with time while the location of the channel cut through the ridge remained in a substantially fixed location.

Further comparison of FIGS. 4 and 5 shows that there is more information available in FIG. 5, particularly with respect to the depth (age) of the deposits than in a conventional coherency plot. This is not unexpected since the coherency determination is doing some kind of spatial smearing in that it is based upon values at more than one point (in depth or horizontal position) whereas the display of the present invention does not involve this kind of smearing. The ground truth is not known in the present instance, but to a good geologic interpreter, the display of FIG. 5 is much more useful. A somewhat similar kind of visualization may be obtained by stepping through the data at different depths in an interactive display; however, the human eye tends to see such steps through an interactive display as motion, rather than a series of static images. The color display of the present invention, on the other hand, is a composite of three static images and the overall geometry of the subsurface features is more easily seen in such static images.

Figure 6:
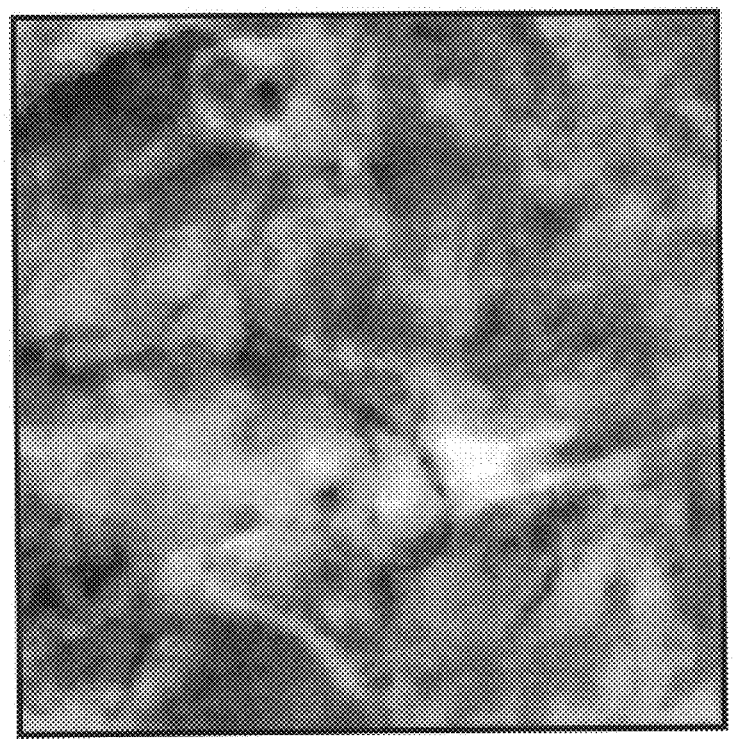
FIG. 6 is a display of seismic amplitudes at 490, 492 and 494 ms. of the same 3-D seismic volume as in FIG. 4.
Figure 7:
FIG. 7 is a display of seismic amplitudes at 496, 498 and 500 ms. of the same 3-D seismic volume as in FIG. 4.
Figure 8:
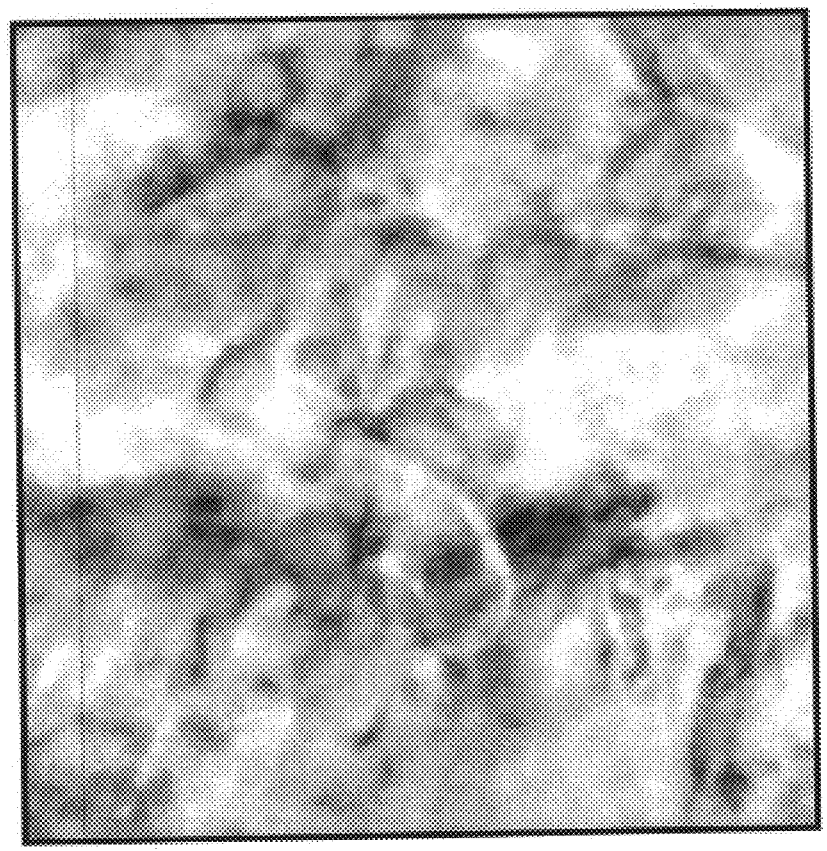
FIG. 8 is a display of seismic amplitudes at 502, 504 and 506 ms. of the same 3-D seismic volume as in FIG. 4.

The ability to graphically display data at a finer geologic resolution is illustrated in FIGS. 6–8 showing data from (490–494 ms), (496–500 ms) and (502–506 ms) respectively. The development of a large meander loop in the channel in the NW quadrant of the display area is clearly seen from the deepest to the shallowest level. During this geologic interval, the channel cut through the ridge remains relatively stationary. Note that the color scheme is defined separately in FIGS. 5–8 in terms of the shallowest to deepest layers, and thus differs from figure to figure. Thus, the layer at 496 ms. is red in FIGS. 5 and 7; the layer at 500 ms. is green in FIG. 5 and blue in FIG. 7, while the layer at 504 ms. is blue in FIG. 5 and green in FIG. 8.

The displays given above are for exemplary purposes only in that characteristics of the seismic data other than amplitudes could also be displayed. For example, coherency, eigenvalue plots, energy, slope, autocorrelation, average trace amplitude, and standard deviation of the amplitude. The list is by no means exhaustive.

The method of the present invention, i.e., displaying three different time slices is related to but different from the Rice patent wherein three attributes of the seismic data at a single time are combined in a color display.

The examples given above comprised displays of constant-time slices of a 3-D seismic volume. In another embodiment of the invention, known methods are used to identify the position of a fault within the 3-D volume. Displays are then produced of seismic attributes along surfaces parallel to the fault surface. In another embodiment of the invention, known methods are used to identify the position of a layer (or horizon) of constant amplitude within the 3-D volume. Displays are then produced of seismic attributes along planes parallel to the picked horizon. In one embodiment of the invention, the slices defined in terms of seismic time. Alternatively, the 3-D volume may be defined in terms of seismic depth by using methods known to those versed in the art: the subsequent displays are then made in terms of depth.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of geophysical prospecting comprising:

(a) obtaining a set of seismic traces distributed over a predetermined three-dimensional (3-D) volume of the earth;

(b) defining at least three surfaces in the 3-D volume and a color associated with each of said at least three surfaces, said at least three surfaces being substantially parallel to each other;

(c) determining a value of an attribute of said set of seismic traces on said at least three surfaces;

(d) coding said values of said attribute onto a color scale associated with each of the at least three surfaces;

(e) displaying, in a single display, coded values of said attributes on the at least three surfaces.

2. The method of claim 1 wherein the at least three surfaces consist of three surfaces, and wherein the associated colors are red, green and blue.

3. The method of claim 1 wherein said attribute is selected from the group consisting of (i) an amplitude of a seismic trace, (ii) a coherency of a seismic trace, (iii) a function of an eigenvalue of a covariance matrix of a seismic trace, (iv) energy of a seismic trace, (v) a slope of a seismic trace, (vi) an autocorrelation of a seismic trace, (vii) an average trace amplitude of a seismic trace, and, (viii) a standard deviation of the amplitude of the seismic trace.

4. The method of claim 1 wherein said at least three surfaces are surfaces of constant time.

5. The method of claim 1 wherein said at least three surfaces are substantially parallel to a predefined surface in the 3-D volume.

6. The method of claim 5 wherein said predefined surface is a fault surface.

7. The method of claim 1 further comprising identifying channel deposits associated with the at least three surfaces.

8. The method of claim 1 wherein displaying in a single display further comprises combining coded values of said attribute into a single color.

9. The method of claim 1 wherein the 3-D volume is defined in terms of seismic reflection times.

10. The method of claim 1 wherein the 3-D volume is defined in terms of seismic depth.

* * * * *